US006114774A

United States Patent [19]

Fiegura

[11] Patent Number: 6,114,774

[45] Date of Patent: Sep. 5, 2000

[54] ENTERTAINMENT SYSTEM FOR MOTOR VEHICLES

[76] Inventor: Michael A. Fiegura, 72 Amber Dr., Croton-on-Hudson, N.Y. 10520

[21] Appl. No.: 09/189,300

[22] Filed: Nov. 10, 1998

[51] Int. Cl.[7] .......................... H04J 1/08

[52] U.S. Cl. .......................... 307/9.1; 381/86; 434/307 A; 455/6.3

[58] Field of Search .......................... 307/10.1, 9.1; 381/86, 61; 348/118; 455/6.3; 434/307 A

[56] References Cited

U.S. PATENT DOCUMENTS

| | | | |
|---|---|---|---|
| 4,637,049 | 1/1987 | Kunugi | 381/86 |
| 4,866,515 | 9/1989 | Tagawa et al. | 455/6.3 |
| 5,250,747 | 10/1993 | Tsumura | 84/645 |
| 5,281,985 | 1/1994 | Chan | 353/13 |
| 5,454,723 | 10/1995 | Horii | 434/307 A |
| 5,473,106 | 12/1995 | Miyashita et al. | 84/609 |
| 5,484,291 | 1/1996 | Nakai et al. | 434/307 A |
| 5,518,408 | 5/1996 | Kawashima et al. | 434/307 A |
| 5,542,000 | 7/1996 | Semba | 434/307 |
| 5,609,486 | 3/1997 | Miyashita et al. | 434/307 A |
| 5,679,911 | 10/1997 | Moriyama et al. | 84/601 |
| 5,684,261 | 11/1997 | Luo | 84/609 |
| 5,713,633 | 2/1998 | Lu | 297/364 |
| 5,739,452 | 4/1998 | Nagata | 84/610 |
| 5,811,708 | 9/1998 | Matsumoto | 84/610 |
| 5,905,947 | 5/1999 | Stein | 455/90 |

*Primary Examiner*—Albert W. Paladini
*Attorney, Agent, or Firm*—Milde, Hoffberg & Macklin, LLP

[57] ABSTRACT

An entertainment system for a motor vehicle comprises a radio, a source of recorded music connected thereto, at least one loudspeaker, and at least one transducer arranged to receive the voice of an occupant of the vehicle and to produce an electronic signal output, and an electronic circuit for receiving said signal and for coupling the signal output to said radio.

11 Claims, 4 Drawing Sheets

FIG. 1
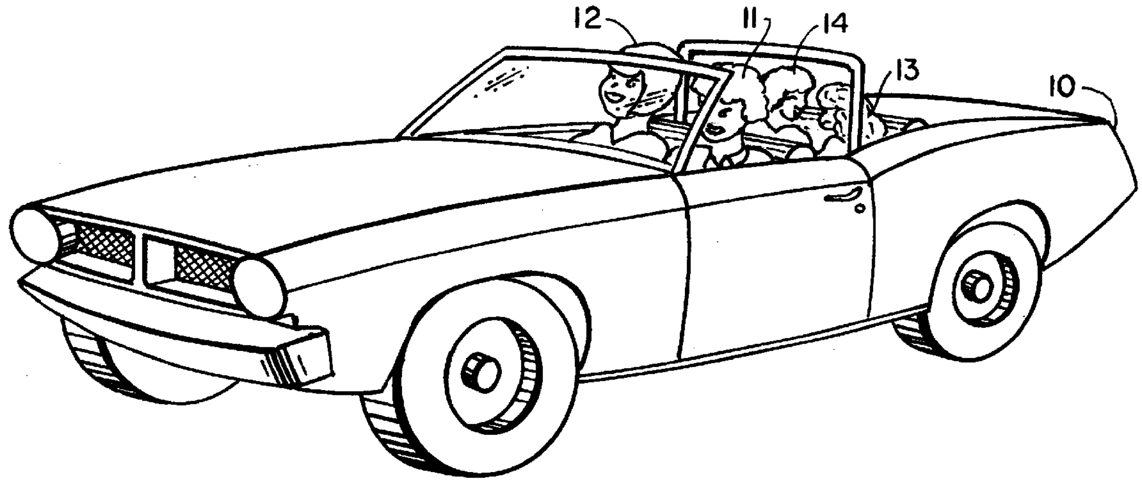
FIG. 2
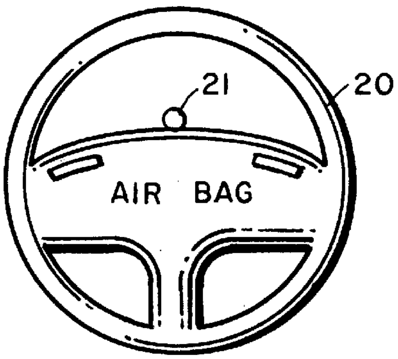
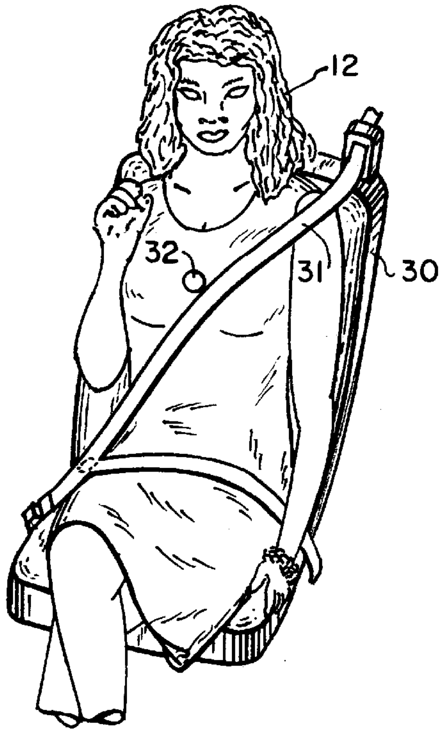
FIG. 3

ENTERTAINMENT SYSTEM FOR MOTOR VEHICLES

BACKGROUND OF THE INVENTION

The present invention relates to a novel entertainment system for motor vehicles, especially for ground transportation. More particularly, the present invention relates to an entertainment system that is integrated into the vehicle's radio system, preferably a stereo radio system. It may be retrofitted to an existing stereo radio system, or it may be installed as a unit with the radio/cassette/CD system when the vehicle is being assembled.

It was probably not long after the automobile was invented that people began to sing as they drove along. Early in the twentieth century, one composer was inspired to write "In My Merry Oldsmobile". However, singing a capella left much to be desired. Enter the radio, which provided accompaniment for the singing, but left one at the mercy of the radio station's disk jockey as to the choice and timing of the selections he played. Later came cassette and CD players integrated into the vehicle's radio system that allowed one to choose a recorded song to sing along with. Again, something was missing. The voices and the music could not be amplified, adjusted and mixed together in a professional, pleasing manner.

Karaoke systems are known, e.g., from U.S. Pat. Nos. 5,250,747; 5,454,723; 5,473,106; 5,484,291; 5,518,408; 5,609,486; 5,679,911; 5,684,261; 5,739,452; and 5,811,708. Karaoke systems allow the voices and the music to be amplified, adjusted and mixed together in a professional, pleasing manner. Generally, these karaoke systems are large bulky systems that run on house current and are not easily portable.

U.S. Pat. No. 5,713,633 describes a chamber in a backrest assembly that may contain a karaoke. U.S. Pat. No. 4,866,515 describes an individual entertainment system installed in each seatback of an airplane with entertainment signals transmitted from a central unit to each individual entertainment system.

However, there are no known integrated systems that provide karaoke accompaniment in a motor vehicle.

An entertainment system for a motor vehicle in accordance with the invention would be highly desirable for anyone embarked on a long journey in a vehicle. If one is driving alone, one encounters fatigue and tends to nod off to sleep while driving—often with tragic consequences. When one is traveling with other adults, sometimes the conversation will lag. When one is traveling with fidgeting children, their constant refrain of "Are we there yet?" is maddening. For all these situations, the entertainment system of the invention is ideal to pass the time and provide entertainment for the occupants of the vehicle.

SUMMARY OF THE INVENTION

It is an object of the invention to provide a novel entertainment system for a motor vehicle.

It is another object of the invention to provide a novel entertainment system that is integrated into the stereo system of a motor vehicle.

It is a still further object of the invention to provide a novel entertainment system that may be retrofitted and integrated into the radio system of the vehicle.

It is yet another object of the invention to provide a novel entertainment system of the invention that is integrated into a unit for installation into a vehicle when it is being assembled.

It is another object of the invention to provide a novel entertainment system for a motor vehicle wherein there is no need for an occupant of the vehicle to hold a microphone to enjoy using the system.

It is a further object of the invention to provide an entertainment system for a motor vehicle in which the microphones are affixed to appropriate parts of the vehicle or its accessories in proximity to the occupants' mouths.

These objects and other objects which will become apparent from the following specification are provided by an entertainment system for a motor vehicle which comprises a radio, a source of recorded music connected thereto, at least one loudspeaker, and at least one transducer arranged to receive the voice of an occupant of the vehicle and to produce an electronic signal output, and an electronic circuit for receiving said signal and for coupling the signal output to said radio.

BRIEF DESCRIPTION OF THE DRAWINGS

FIG. 1 illustrates a vehicle with occupants, the father as the driver, the mother as a front seat passenger, and their two children in the rear seat.

FIG. 2 shows the steering wheel of the vehicle with a microphone mounted on the steering wheel for use of the driver.

FIG. 3 shows the mother, seated in the front passenger seat. She is wearing a shoulder belt on which is affixed a microphone for her use.

DESCRIPTION OF THE PREFERRED EMBODIMENTS OF THE INVENTION

Figure 4:
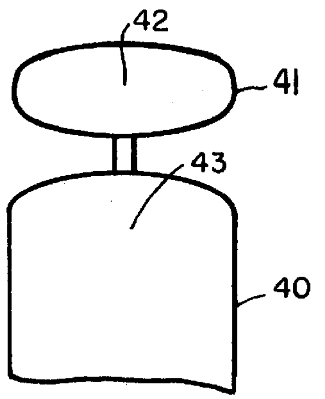
FIG. 4 is a view of the backside of one of the front seats showing the alternative placements for a microphone for the rear seat occupants of the vehicle.

Generally, a small microphone, preferably a directional microphone, is provided for every occupant of the vehicle. The microphone may either hang from the ceiling of the vehicle or be attached to the shoulder strap seat belt. For the driver, the microphone may be mounted on the steering wheel. All microphones may be connected through amplifiers to a mixer, which mixes controlled amounts of audio from each microphone with the audio of the car radio, cassette player, compact disc player or video player. After mixing, the audio signals are passed through the balance and fader controls of the vehicle's sound system to the loudspeaker(s) of the vehicle.

In describing the elements of the following figures, the same reference numerals are used wherever possible to indicate the same or similar elements.

FIG. 1 illustrates a vehicle 10 with occupants, the father 11 as the driver, the mother 12 as a front seat passenger, and their son 13 and daughter 14 in the rear seat.

FIG. 2 shows the steering wheel 20 of the vehicle 10 with a microphone 21 mounted on the steering wheel for use of the father 11.

FIG. 3 shows the mother 12 seated in the front passenger seat 30. She is wearing a shoulder belt 31 on which is affixed a microphone 32 for her use. Her smile is a manifestation of the joy she experiences from using the entertainment system of the invention.

FIG. 4 is a view of the backside of one of the front seats 40 showing the alternative placements either in the headrest 42 or in the back of the seat 43 for a microphone for the rear seat occupants of the vehicle 10.

Figure 5:
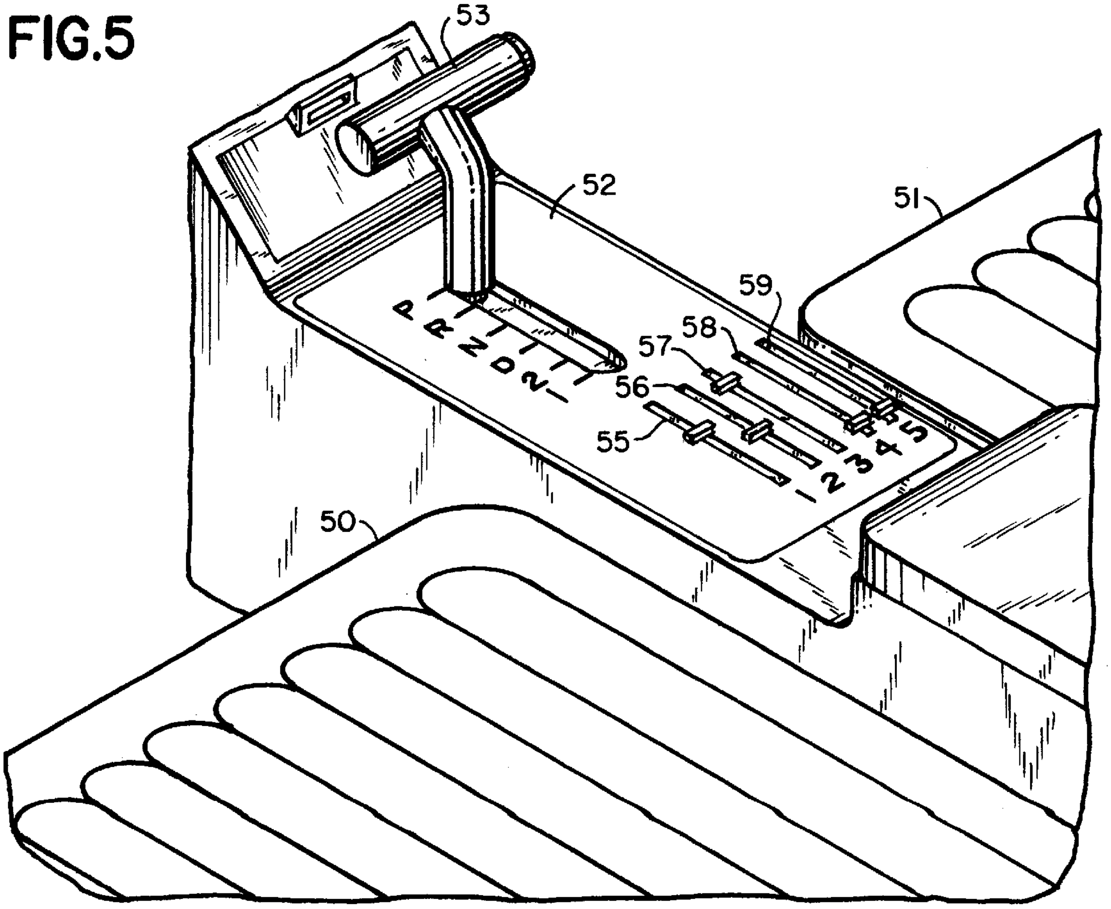
FIG. 5 is a top view of the center console between the two front seats of the vehicle with the controls for the entertainment system of the invention shown.

FIG. 5 is a top view of the center console 52 between the two front seats 50 and 51 of the vehicle 10 with the fader controls 55 to 59 for the microphones 91 to 95 (shown in FIG. 6 or 8) respectively of the entertainment system of the invention shown located on the console behind the transmission shift lever 53. Controls 55 to 59 adjust the level of signal output from each of the five microphones in the vehicle 10. Control 55 adjusts the output of the microphone of the father 11. Control 56 adjusts the output of the microphone of the mother 12. Control 57 adjusts the output of the microphone of the son 13. Control 59 adjusts the output of the microphone of the daughter 14. Control 58 is for adjusting the output of the microphone of the occupant of the center position in the rear seat, which is unoccupied. For retrofitted systems such as those illustrated in FIGS. 6 and 8, the fader controls 55 to 59 may be contained in a separate enclosure. The bottom of the enclosure may have an adhesive strip for attachment to the console of the vehicle.

Figure 6:
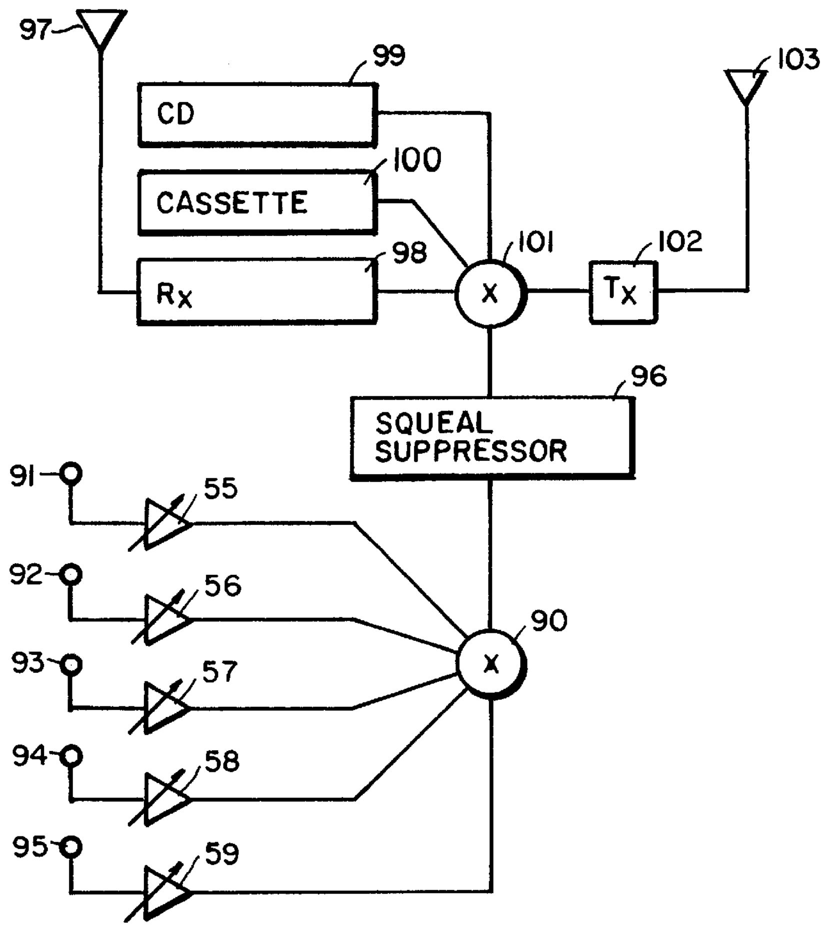
FIG. 6 is a schematic diagram of one configuration of the entertainment system of the invention that is suitable for retrofitting into a vehicle.

FIG. 6 illustrates an entertainment system of the invention which is suitable for retrofitting to a vehicle. In the system illustrated, the output from microphones 91 to 95 are controlled by variable amplifiers 55 through 59 respectively, which in turn are coupled to a first mixer 90, the output of which is coupled to squeal suppressor 96. Receiving antenna 97 is coupled to radio section 98, the output of which and the outputs from CD player 99 and cassette player 100 are coupled to a second mixer 101, the output of which is coupled to transmitter 102 which in turn is coupled to transmitting antenna 103. In operation, the variable amplifiers 55 to 59 control the amplitude of the output of microphones 91 to 95 respectively in order to adjust the differences in the singing voices of the occupants of the vehicle, squeal suppressor or echo cancellation 96 serves to suppress the squeal or echo that would be induced in the system by the proximity of the microphones 91 to 95 and the radio receiver 98. Through selection of the output from the radio section 98, the CD player 99 or the cassette player 100, mixer 101 mixes the selected output from elements 98 to 100 with the output from the squeal suppressor 96 and feeds it to the transmitter 102, which transmits on an FM frequency on the FM dial that is not used for broadcast. The signal from the transmitting antenna 103 is picked up by the receiving antenna of the car stereo radio (not shown), which is tuned to the selected FM frequency. The signal is amplified and coupled to the loudspeakers and adjusted by the fader and balance controls already present in the stereo system of the vehicle.

Figure 7:
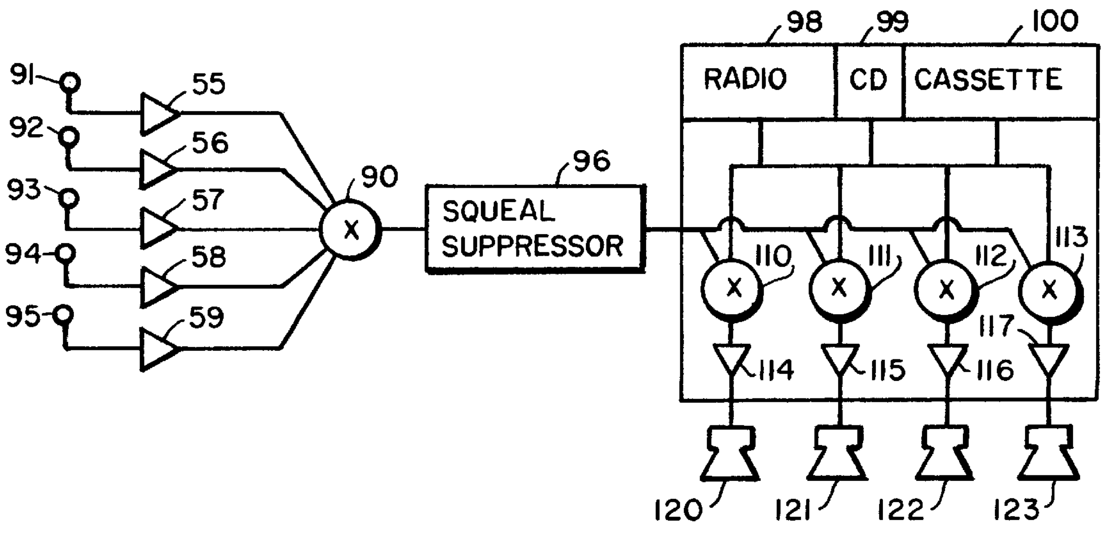
FIG. 7 is a schematic diagram of a basic configuration of the entertainment system of the invention that is intended for integration into a single unit for installation in the vehicle when it is being assembled.

FIG. 7 illustrates a basic entertainment of the system which is integrated into the automobile's stereo radio/CD/cassette player. The outputs of microphones 91 through 95 are respectively controlled by variable amplifiers 55 through 59, the output of each of which is coupled to a first mixer 90, the output of which in turn is coupled to squeal suppresser 96, which performs the same functions as mentioned in connection with FIG. 6. The output of squeal suppresser 96 is coupled to second to fourth mixers 110 through 113. The selected output of radio 98, CD player 99 or cassette player 100 is also coupled to mixers 110 through 113, where the selected signal is mixed with the output from the squeal suppresser 96. In turn, mixers 110 through 113 respectively are coupled to amplifiers 114 through 117, which in turn are coupled to loudspeakers 120 through 123. Again, as in FIG. 6, the fader controls for the integrated entertainment system of the invention are present on the radio/CD/cassette section of the integrated unit.

Figure 8:
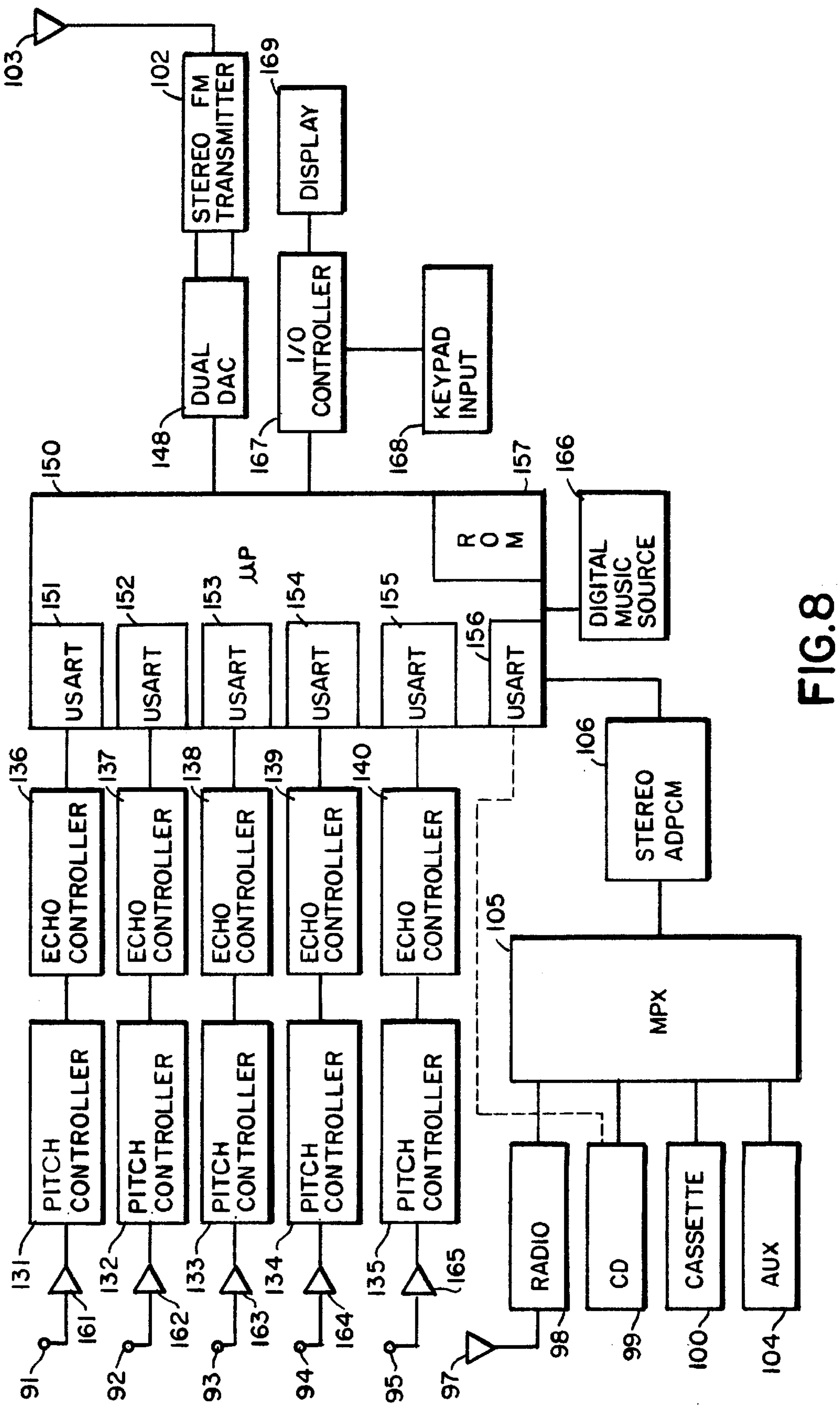
FIG. 8 is a schematic diagram of a more sophisticated configuration of the entertainment system of the invention that is also intended for retrofitting into a vehicle.

FIG. 8 illustrates a more sophisticated system intended for retrofitting into a vehicle. Microphones 91 to 95 are respectively coupled to preamplifiers 161 to 165, the outputs of which are respectively coupled to pitch controllers 131 to 135. Pitch controllers 131 to 135 tend to counteract any off-key singing. Pitch controllers 131 to 135 in turn are respectively coupled to echo controllers 136 to 140, each of which in turn is coupled to USARTs 151 to 155 respectively. USARTs 151 to 156 are present on microprocessor chip 150, as is ROM 157. Receiving antenna 97 receives radio broadcast frequencies for radio 98. Radio 98, CD 99, cassette 100 and auxiliary 104 are coupled to multiplex 105, which in turn is coupled to stereo ADPCM 106. ADPCM 106 is coupled to USART 156. An alternative coupling to USART 156 for CD 99 is shown by the dotted line. Also coupled to microprocessor 150 is digital music source 166, which may be a hard drive or a memory card, etc. Microprocessor 150 is coupled to dual DAC 148, which in turn is coupled to Stereo FM transmitter 102, which broadcasts via antenna 103 to an unused frequency on the FM dial of the radio of the vehicle. The dial is tuned to receive the frequency being broadcast from transmitter 102. Also coupled to microprocessor 150 is input/output controller 167, which receives control input by means of keypad input 168. The status of the system and the input may be viewed on a display 169, which may be an LCD display.

The power source for the systems in FIGS. 6 to 8 may be the vehicle's electrical system, i.e., the vehicle's battery. The systems in FIGS. 6 and 8 may be connected to the vehicle's electrical system through the vehicle's cigarette lighter socket. Alternatively, they may be hardwired to the electrical system. The systems in FIGS. 6 and 8 may instead be operated from internal batteries.

The components depicted in FIGS. 6 to 8 are available from a number of manufacturers, e.g. Texas Instruments, OKI, Motorola and Lucent Technologies.

The foregoing specification and drawings have thus described and illustrated a novel entertainment system for a motor vehicle. Many changes, modifications, variations and other uses and applications of the subject invention will, however, become apparent to those skilled in the art after considering this specification, which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. In an entertainment system for a motor vehicle comprising a radio which produces a first output signal, a source of recorded music which produces a second output signal, a switch coupled to the radio and the recorded music source for selecting one of said first and second signals and passing said one signal to a third signal output, at least one loudspeaker and circuit means for connecting said third signal output to said loudspeaker, the improvement comprising at least one transducer arranged to receive the voice of an occupant of the vehicle and to produce a fourth output signal in response thereto, an electronic mixer circuit coupled to receive said third output signal and said fourth output signal for producing a fifth output signal which is a combination of said third and fourth signals, said mixer circuit being coupled to said connecting means to supply the fifth signal to the loudspeaker.

2. An entertainment system as claimed in claim 1, wherein there are at least two transducers present in the system, each arranged to receive the voice of a different occupant of the vehicle.

3. An entertainment system as claimed in claim 2, wherein the electronic signal output from each transducer is coupled to said mixer circuit.

4. An entertainment system as claimed in claim 3, wherein controls for said mixer circuit are present on a center console for a transmission gear shift lever.

5. An entertainment system as claimed in claim 2, wherein at least one of the transducers is affixed to a seatbelt of the motor vehicle in proximity to the seatbelt wearer's mouth.

6. An entertainment system as claimed in claim 1, wherein said at least one transducer is disposed on a rear side of a front seat facing a rear seat occupant of the vehicle.

7. An entertainment system as claimed in claim 1, wherein said at least one transducer is disposed on a hub of a steering wheel facing a vehicle driver.

8. An entertainment system as claimed in claim 1, wherein said at least one transducer is disposed on a dashboard facing an occupant of the vehicle.

9. An entertainment system as claimed in claim 1, wherein said at least one transducer is a directional microphone.

10. An entertainment system as claimed in claim 1, wherein, as the at least one transducer, there is present one microphone for each occupant of the vehicle, the output of each microphone is coupled to a variable amplifier, the output of which is in turn coupled to an auxiliary mixer circuit, the output of the auxiliary mixer circuit is coupled to a squeal suppressor and wherein the output of said squeal suppressor is said fourth signal which is coupled to said mixer circuit.

11. An entertainment system as claimed in claim 1, further comprising a squeal suppressor for suppressing feedback from the loudspeaker to the at least one transducer.

* * * * *